(12) United States Patent
Senoo et al.

(10) Patent No.: US 9,653,957 B2
(45) Date of Patent: May 16, 2017

(54) STATOR WITH COIL FIXING MEMBER AND ELECTRIC MOTOR WITH THE STATOR

(71) Applicant: FANUC CORPORATION, Yamanashi (JP)

(72) Inventors: Tatsuya Senoo, Yamanashi (JP); Yoshinori Murakami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 23 days.

(21) Appl. No.: 14/922,295

(22) Filed: Oct. 26, 2015

(65) Prior Publication Data

US 2016/0118854 A1 Apr. 28, 2016

(30) Foreign Application Priority Data

Oct. 27, 2014 (JP) ................. 2014-218202

(51) Int. Cl.
*H02K 15/06* (2006.01)
*H02K 3/52* (2006.01)

(52) U.S. Cl.
CPC ........... *H02K 3/522* (2013.01); *H02K 15/066* (2013.01); *H02K 2203/12* (2013.01); *H02K 2213/03* (2013.01)

(58) Field of Classification Search
CPC ....... H02K 3/522; H02K 3/12; H02K 2203/12
USPC .......................... 310/208, 214, 215, 270, 194
See application file for complete search history.

(56) References Cited

U.S. PATENT DOCUMENTS

| 6,566,779 | B2* | 5/2003 | Takano | H02K 1/148 310/194 |
| 8,008,832 | B2* | 8/2011 | Rhode | H02K 1/148 310/216.058 |
| 8,466,590 | B2* | 6/2013 | Hauser | H02K 3/522 310/68 B |
| 8,482,172 | B2* | 7/2013 | Sasaki | H02K 3/522 310/180 |
| 9,343,930 | B2* | 5/2016 | Hoffman | H02K 1/185 |
| 2012/0062051 | A1* | 3/2012 | Ueno | H02K 1/148 310/43 |

(Continued)

FOREIGN PATENT DOCUMENTS

| JP | 2002199627 A | 7/2002 |
| JP | 2010246269 A | 10/2010 |
| JP | 2012095492 A | 5/2012 |

OTHER PUBLICATIONS

English Abstract for Japanese Publication No. 2010-246269 A, published Oct. 28, 2010, 1 pg.

(Continued)

*Primary Examiner* — Terrance Kenerly
(74) *Attorney, Agent, or Firm* — Fredrikson & Byron, P.A.

(57) ABSTRACT

A stator includes: a stator core having a yoke and teeth projecting from the yoke; coils attached to the stator core so as to surround the teeth; and coil fixing members, each of which is arranged at at least one of opposite ends of the stator core in a gap formed between an end face of the tooth and an inner side of the coil facing the end face. The coil fixing member includes a locking part that projects on the opposite side from the end face of the tooth to lock the coil and a projection that projects on the opposite side from the locking part, and the projection is inserted into an insert hole formed on the stator core.

4 Claims, 10 Drawing Sheets

(56) References Cited

U.S. PATENT DOCUMENTS

2015/0130320 A1* 5/2015 Murakami ............ H02K 3/522
310/208

OTHER PUBLICATIONS

Untranslated Notification of Reasons for Refusal mailed by JPO, Jan. 26, 2016, 5 pages.
English machine translation of Notification of Reasons for Refusal mailed by JPO, Jan. 26, 2016, 4 pages.
Untranslated Decision to Grant a Patent mailed by JPO, Jun. 28, 2016, 3 pages.
English machine translation of Decision to Grant a Patent mailed by JPO, Jun. 28, 2016, 3 pages.
English translation of Japanese Publication No. 2012095492, published May 17, 2012, 22 pages.
English translation of Japanese Publication No. 2002199627, published Jul. 12, 2002, 8 pages.

* cited by examiner

STATOR WITH COIL FIXING MEMBER AND ELECTRIC MOTOR WITH THE STATOR

BACKGROUND OF THE INVENTION

1. Field of the Invention

The present invention relates to a stator including a coil fixing member for fixing a coil to the stator and an electric motor including the stator.

2. Description of the Related Art

FIG. 7 is a diagram showing a process for attaching a unit coil to a stator in the related art. A stator core 102 of a stator 100 includes a cylindrical yoke 104, a plurality of teeth 106 projecting radially inwards from the yoke 104, and unit coils 108 attached to the stator core 102 so as to surround the teeth 106. In FIG. 7, only one unit coil 108 is shown. In the stator 100 of the electric motor with the unit coils 108 arranged around the teeth 106, it is necessary to provide means for preventing the unit coils 108 from dislodging from the teeth 106. For example, JP2010-246269A discloses a configuration in which an insulator is attached to teeth so as to surround the teeth and lock unit coils.

However, the insulator described in JP2010-246269A needs to be sized so as to be suited to the shapes of the teeth. Thus, an insulator cannot be commonly used for stators having different tooth shapes. Further, the insulator has a complicated structure, leading to an increase in manufacturing costs.

Under such circumstances, there is a need for an inexpensive stator provided with a coil fixing means adapted for various applications.

SUMMARY OF THE INVENTION

According to a first aspect of the present invention, a stator of an electric motor, comprising: a stator core having a yoke and teeth projecting from the yoke; coils attached to the stator core so as to surround the teeth; and coil fixing members which are each arranged at at least one of opposite ends of the stator core in a gap formed between an end face of the tooth and an inner side of the coil facing the end face to fix the coil, wherein each of the coil fixing member comprises a locking part that projects on an opposite side from the end face of the tooth to lock the coil and a projection that projects on an opposite side from the locking part, and the projection is inserted into an insert hole formed on the stator core, is provided.

According to a second aspect of the invention, in the stator according to the first aspect, the projection at least partially has a dimension greater than the insert hole in a section taken in a plane perpendicular to an insertion direction in which the projection is inserted into the insert hole, and the projection is press-fitted into the insert hole.

According to a third aspect of the present invention, in the stator according to the second aspect, the projection has a non-circular section taken in a plane perpendicular to the insertion direction, and has a first dimension and a second dimension on the non-circular section, the first dimension being defined by a length of a first line segment passing through a predetermined point, the second dimension being defined by a length of a second line segment passing through the predetermined point, the second dimension being greater than the first dimension, and the projection is press-fitted into the insert hole at a portion where a distance between opposing walls of the insert hole is greater than the first dimension and smaller than the second dimension.

According to a fourth aspect of the present invention, an electric motor comprising the stator according to any one of the first to third aspects is provided.

According to a fifth aspect of the present invention, a manufacturing process of manufacturing a stator of an electric motor, comprising attaching coil fixing members for fixing coils to a stator core, wherein each of the coil fixing member comprises a locking part for locking the coil and a projection that projects on an opposite side from the locking part, the manufacturing process comprising: inserting the projection of the coil fixing member into an insert hole formed on the stator core; and thereafter turning the coil fixing member about an axis line parallel to an insertion direction in which the projection is inserted into the insert hole so as to press-fit the coil fixing member into the insert hole, is provided.

These and other objects, features and advantages of the present invention will become more apparent in light of the detailed description of exemplary embodiments thereof as illustrated in the drawings.

DETAILED DESCRIPTION

Figure 1:
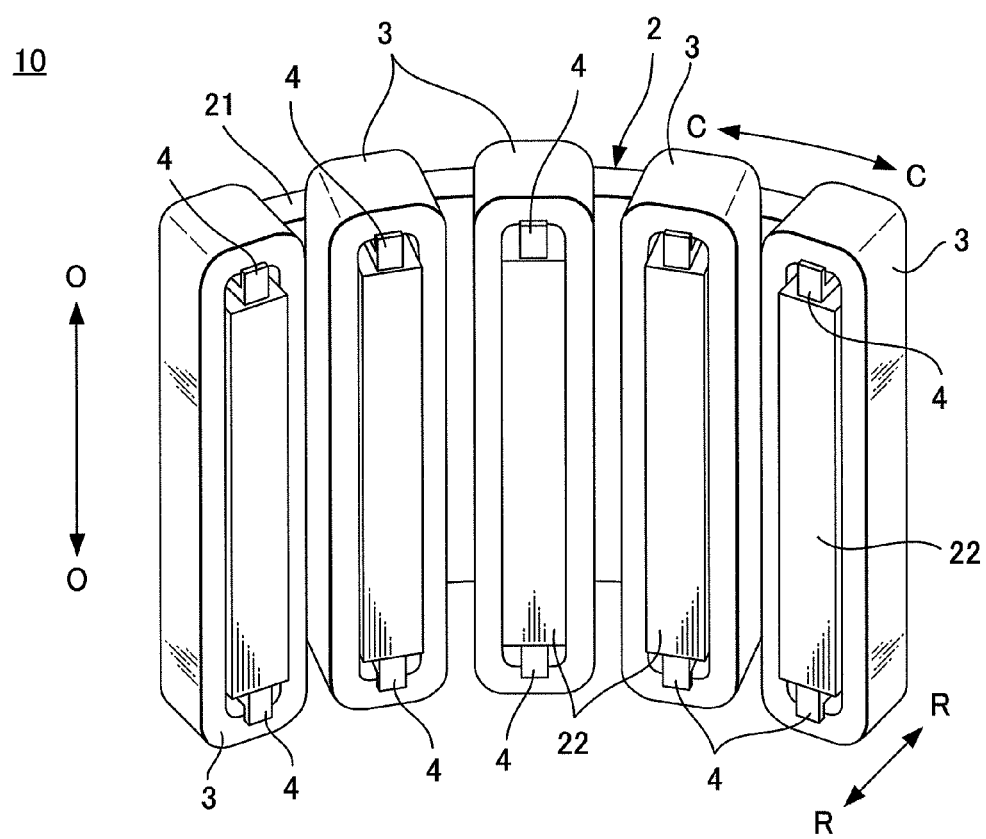
FIG. 1 is a partially enlarged view showing a stator according to one embodiment.

Referring to the drawings, embodiments of the present invention will be described. The constituent elements shown in the drawings may be modified in scale as necessary for better understanding of the present invention. Further, the same or corresponding constituent elements are allotted with the same reference numerals.

The electric motor converts electric energy into mechanical energy by an electromagnetic interaction between a stator and a rotor that cooperate with each other. The stator includes windings that generate a rotating magnetic field in response to an alternating current supplied thereto, whereas the unillustrated rotor includes magnets arranged on the opposing surface facing the stator.

FIG. 1 is a partially enlarged diagram showing a stator according to one embodiment. A stator 10 includes: a stator core 2 formed of electromagnetic steel sheets laminated in the axial direction O in the drawing; a plurality of unit coils 3 arranged in the circumferential direction C along the inner circumferential surface of the stator core 2; and coil fixing members 4 that each fix unit coils 3 so as to prevent the unit coils 3 from dislodging from the stator core 2. The stator 10 is arranged concentrically with the unillustrated rotor that is provided on the inside of the stator 10 in the radial direction R. Although FIG. 1 only shows part of the stator 10, the stator 10 has a continuous structure along the circumferential direction C based on the structure as shown in FIG. 1.

Figure 7:
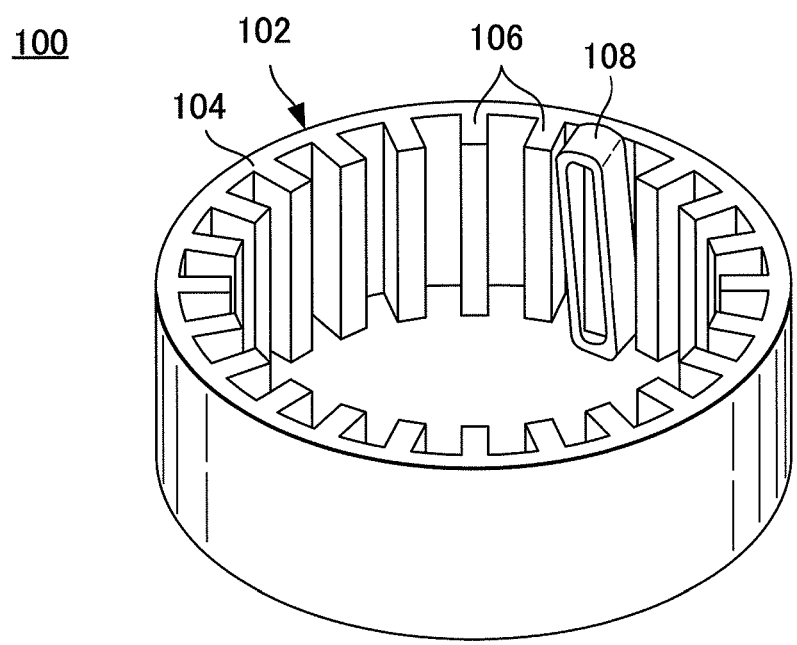
FIG. 7 is a view showing a process of attaching a unit coil to a stator in the related art.

The stator core 2 includes: a cylindrical yoke 21; a plurality of teeth 22 that project from the yoke 21 inwardly in the radial direction R and arranged at certain intervals in the circumferential direction C. The stator core 2 has the same shape as that of the known stator core described with FIG. 7. The stator core 2 may have other known configurations. The stator core 2 may be integrally formed, rather than having a laminated core structure.

Each unit coil 3 is attached to the stator core 2 so as to surround a tooth 22 of the stator core 2. Inserted in a gap between the inner side of the unit coil 3 and the end face 22a of the tooth 22 is a coil fixing member 4 having a roughly L-shape. The unit coil 3 is fixed by the coil fixing member 4 so as not to move inwardly in the radial direction R. In the illustrated embodiment, the coil fixing member 4 is arranged on either side of the stator 10 in the axial direction O. However, as long as the unit coil 3 is sufficiently fixed in a reliable manner, the coil fixing member 4 may be arranged on only one end of the stator 10.

Figure 2:
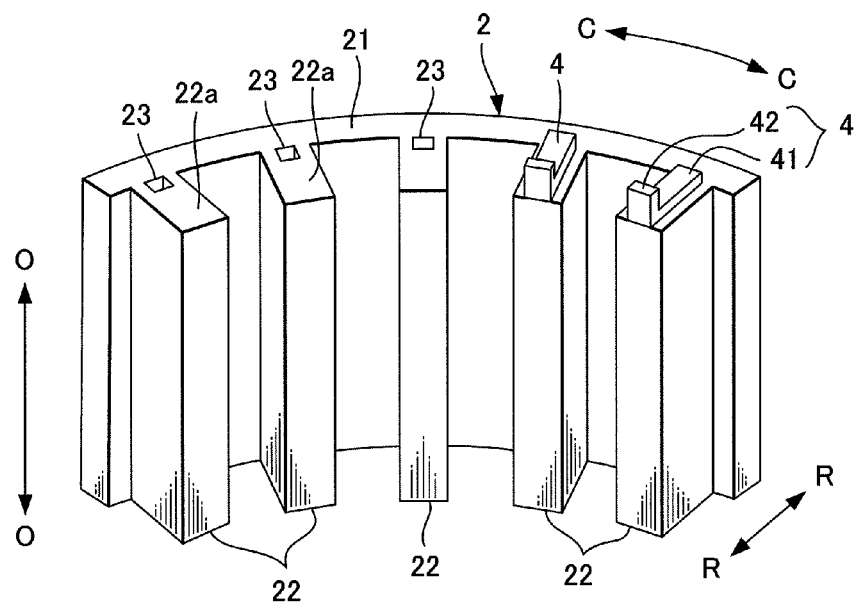
FIG. 2 is a partially enlarged view showing coil fixing members and insert holes.
Figure 3:
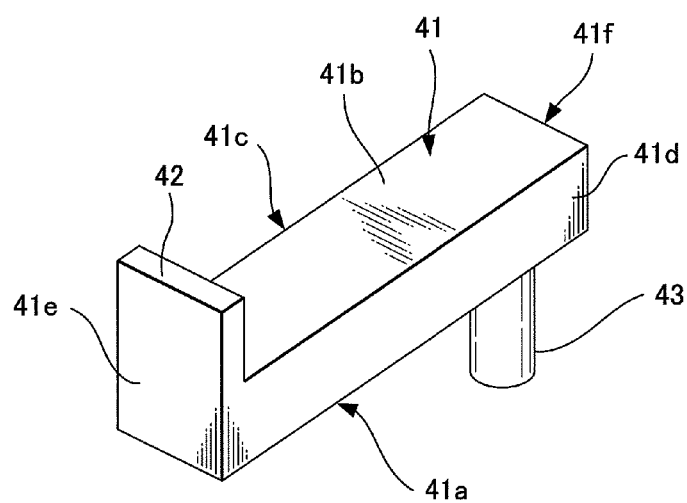
FIG. 3 is a perspective view showing an exemplary configuration of the coil fixing member.

FIG. 3 is a perspective view showing an exemplary configuration of the coil fixing member 4. The coil fixing member 4 has a main body 41, a locking part 42 and a projection 43. The main body 41 is a part having a generally rectangular parallelepiped shape that is defined by a generally flat bottom 41a abutting the end face 22a of the tooth 22 (see FIG. 2), a generally flat top 41b located to face the inner side of the unit coil 3, sides 41c and 41d connecting the bottom 41a and top 41b to each other, and end faces 41e and 41f.

The locking part 42 is formed at one end of the main body 41 and projects from the top 41b of the main body 41 in the opposite direction from the bottom 41a. The locking part 42 projects from the main body 41 so that the side of the unit coil 3 abuts the locking part 42 when the unit coil 3 moves inwardly in the radial direction R, thereby preventing the unit coil 3 from dislodging from the stator core 2.

The projection 43 has an elliptic cylindrical shape, for example, and projects from the main body 41 on the opposite side from the locking part 42. Although the illustrated coil fixing member 4 has the projection 43 formed near the end face 41f on the opposite side from the end face 41e where the locking part 42 extends, the position of the projection 43 is not limited thereto. The projection 43 is sized so as to be inserted into the insert hole 23 formed on the stator core 2, and the coil fixing member 4 is positioned by the projection 43. Accordingly, when the coil fixing member 4 is attached to the stator core 2, only the main body 41 and locking part 42 are exposed outside the stator core 2.

FIG. 2 is a partially enlarged view showing the coil fixing members 4 and the insert holes 23. In FIG. 2, five teeth 22 are illustrated, two of which are provided with the coil fixing members 4 attached thereto. The insert hole 23 is formed near the base part of the tooth 22 and has, for example a rectangular cross-section taken in a plane perpendicular to the axial direction O. The unit coils 3 (see FIG. 1) are successively assembled to the teeth 22 provided with the coil fixing members 4, and then locked by the locking parts 42 of the corresponding coil fixing members 4 so as not to move inwardly in the radial direction R.

Figure 4A:
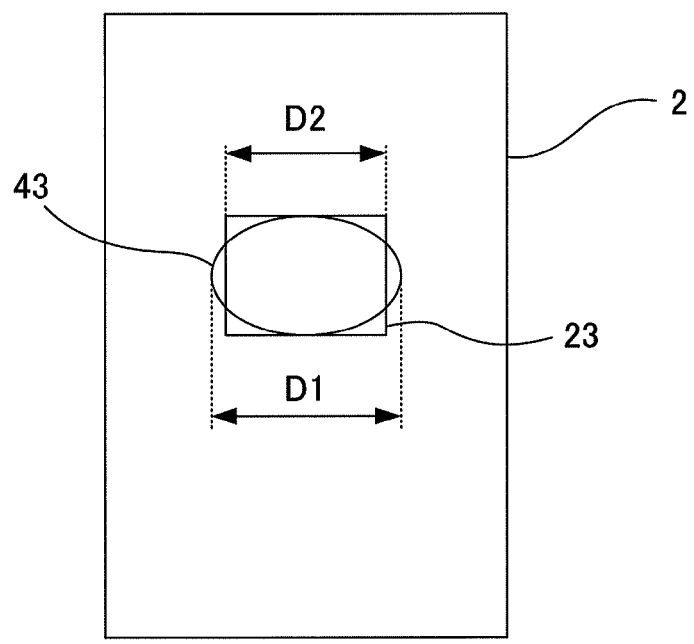
FIG. 4A is a diagram for illustrating a process of inserting the coil fixing member into the insert hole.
Figure 4B:
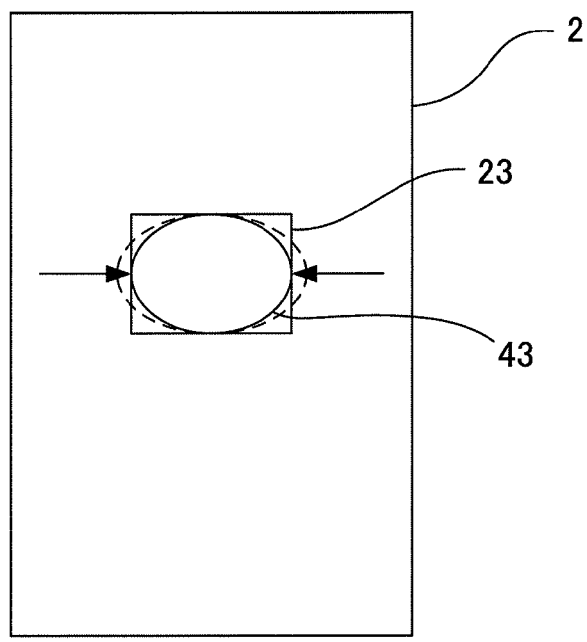
FIG. 4B is a diagram for illustrating a process of inserting the coil fixing member into the insert hole.

FIGS. 4A and 4B are sectional views taken in a plane perpendicular to the direction in which the projection 43 of the coil fixing member 4 is inserted into the insert hole 23. As shown in FIG. 4A, the insert hole 23 has a rectangular cross section, whereas the projection 43 has an elliptic cross section. The projection 43 and the insert hole 23 are sized so that the dimension D1 of the major axis of the projection 43 is greater than the transverse dimension D2 of the insert hole 23. In other words, the projection 43 and the insert hole 23 are sized so that the projection 43 is press-fitted into the insert hole 23. As a result, the projection 43 receives a compressive force from the wall of the insert hole 23 as indicated by the arrows in FIG. 4B, whereby the coil fixing member 4 is firmly fixed to the stator core 2.

Figure 5A:
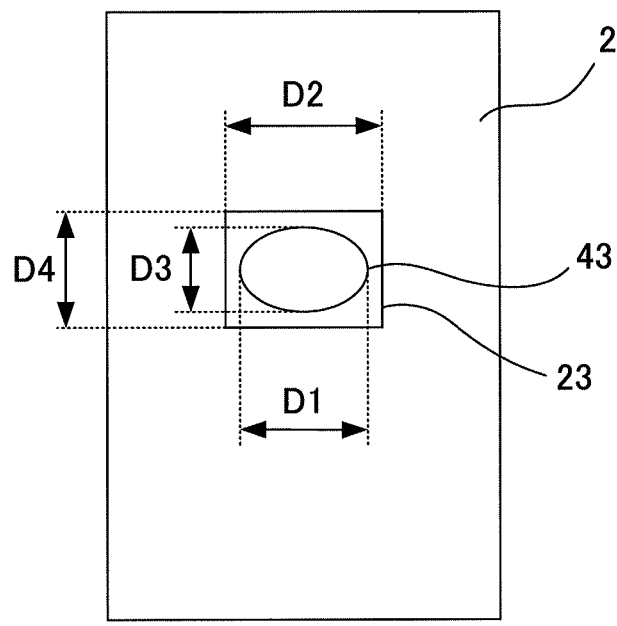
FIG. 5A is a diagram for illustrating a process of inserting the coil fixing member into the insert hole.
Figure 5B:
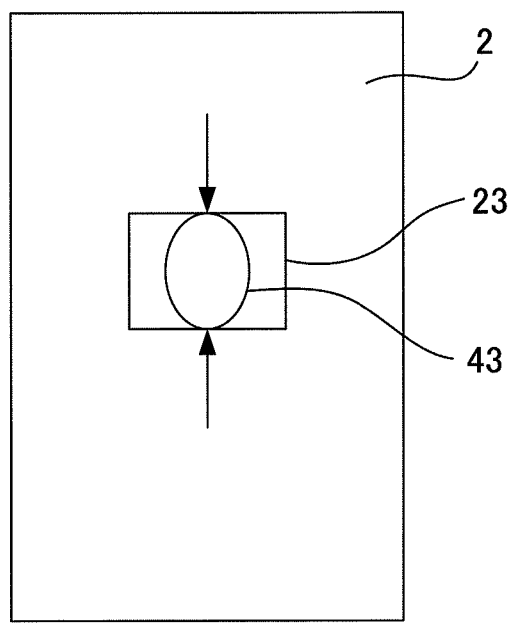
FIG. 5B is a diagram for illustrating a process of inserting the coil fixing member into the insert hole.

FIGS. 5A and 5B are diagrams showing another manner in which the coil fixing member 4 is attached to the stator core 2. FIGS. 5A and 5B are diagrams corresponding to FIGS. 4A and 4B, respectively. Similarly to the aforementioned example, the insert hole 23 has a rectangular cross section and the projection 43 has an elliptical cross section. In this case, the projection 43 and the insert hole 23 are sized so that the dimension D1 of the major axis of the projection 43 is smaller than the transverse dimension D2 of the insert hole 23 and is greater than the vertical dimension D4 of the insert hole 23. Further, the projection 43 and the insert hole 23 are sized so that the dimension D3 of the minor axis of the projection 43 is smaller than the vertical dimension D4 of the insert hole 23.

The projection 43 of the coil fixing member 4 is inserted into the insert hole 23 with its major axis oriented in the transverse direction, as shown in FIG. 5A. Then, the coil fixing member 4 is rotated by 90 degrees about an axis line parallel to the direction in which the coil fixing member 4 is inserted (the direction perpendicular to the plane of the drawing of FIG. 5A), while the projection 43 remains inserted in the insert hole 23. As a result, the major axis of the projection 43 is aligned in the vertical direction of the insert hole 23, as shown in FIG. 5B. Since the dimension D1 of the major axis of the projection 43 is greater than the vertical dimension D4 of the insert hole 23, the projection 43 receives a compressive force from the wall of the insert hole 23, as indicated by the arrows in FIG. 5B. As a result, the projection 43, or the coil fixing member 4, is fixed at a predetermined position relative to the stator core 2 (in particular, the tooth 22).

Figure 6A:
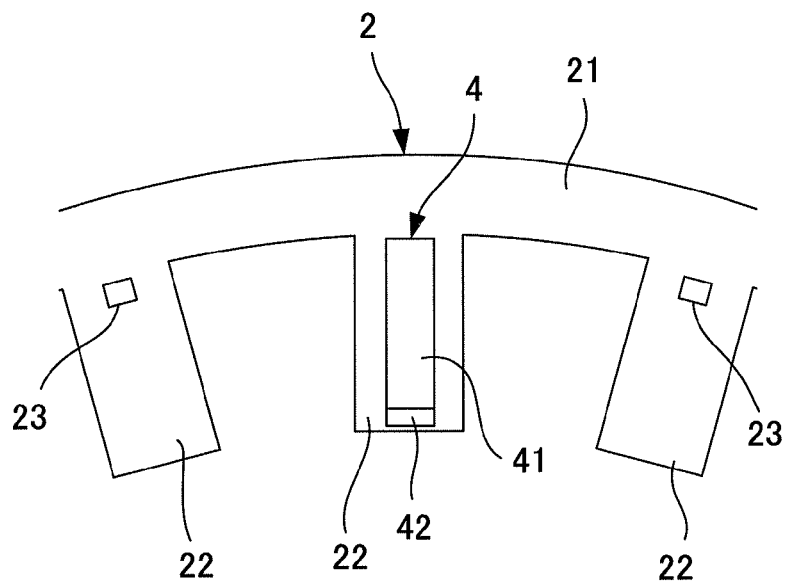
FIG. 6A is an end view showing the positions where the insert holes are formed.
Figure 6B:
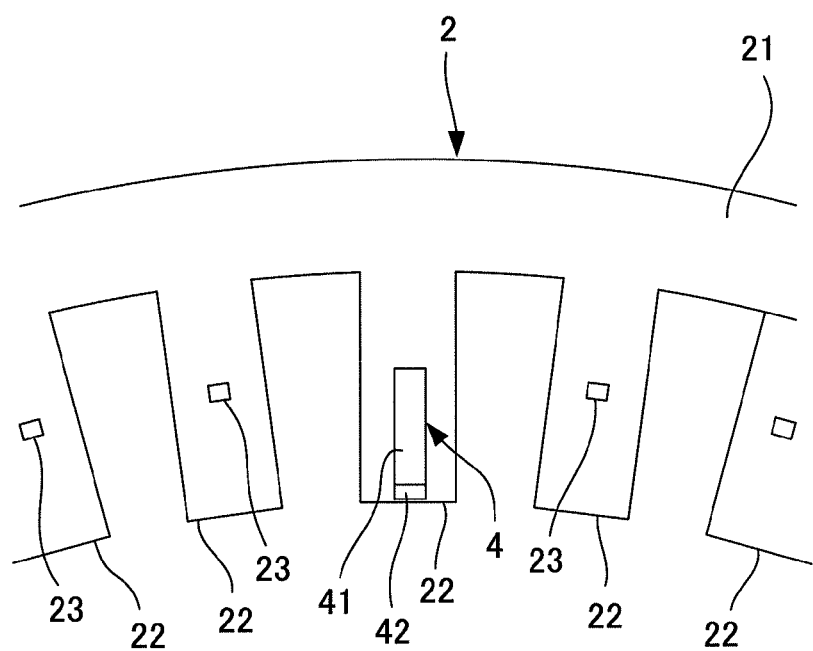
FIG. 6B is an end view showing the positions where the insert holes are formed.

FIGS. 6A and 6B are end views showing the positions where insert holes 23 are formed. In the exemplary configuration of FIG. 6A, the insert hole 23 is formed near the base part of each tooth 22, whereas in the exemplary configuration of FIG. 6B, the insert hole 23 is formed at the middle position between the base part and the tip end of the tooth 22. Only one coil fixing member 4 is shown in FIGS. 6A and 6B, respectively, and they have the same dimensions and shape. This means that FIG. 6A is depicted in a larger scale than FIG. 6B.

In the example shown in FIG. 6A, the longitudinal dimension of the main body 41 of the coil fixing member 4 is substantially the same as the projection length of the tooth 22. Accordingly, if the insert hole 23 is formed near the base part of the tooth 22, the locking part 42 of the coil fixing member 4 is generally disposed at the tip end of the tooth 22.

In contrast, in the example shown in FIG. 6B, the longitudinal dimension of the main body 41 of the coil fixing member 4 is about half the length of the tooth 22. Accordingly, if the insert hole 23 is formed at the middle position of the tooth 22, the locking part 42 of the coil fixing member 4 is generally disposed at the tip end of the tooth 22.

The stator according to the above described embodiment has the following advantages:

(1) The coil fixing member 4 has the locking part 42 that extends so as to project from the end face 22 of tooth 22. By virtue of this configuration, the unit coil 3 is locked at a predetermined position by the locking part 42, whereby it is possible to prevent the unit coil 3 from dislodging from the stator core 2. Since the coil fixing member 4 has a relatively simple configuration, the manufacturing cost can be reduced.

(2) The coil fixing member 4 is provided at at least one of opposite ends of the stator core 2, and the coil fixing members 4 are members independent from one another. Therefore, regardless of the shape of the stator core 2, in particular, regardless of the width and the dimension in the axial direction O of the tooth 22, the coil fixing member 4 can be commonly used for various kinds of stators 10. This reduces the manufacturing cost and maintenance cost of the stator 10.

(3) The coil fixing member 4 is attached to the stator core 2 by press-fitting the projection 43 of the coil fixing member 4 into the insert hole 23. Accordingly, the coil fixing member 4 can be easily attached to the stator core 2 without the need for a special fixing means.

(4) The attachment position of the coil fixing member 4 relative to the tooth 22 can be easily changed by changing the position where the insert hole 23 is formed. As a result, it is possible to use a common coil fixing member 4 for the stator cores 2 having teeth 22 of different projection sizes. Since the rotor is arranged inside the stator 10, it is advantageous that the position of the coil fixing member 4 relative to the tooth 22 can be easily adjusted so that the coil fixing members 4 and the unit coils 3 do not project inwards from the teeth 22.

(5) According to the configuration in which the coil fixing member 4 formed with a projection 43 having an elliptic cross section is inserted into the insert hole 23 having a rectangular cross section, the projection 43 can be easily press-fitted to the insert hole 23 by inserting the projection 43 into the insert hole 23 and then rotating the coil fixing member 4 about an axis parallel to the direction in which the coil fixing member 4 is inserted. When the stator core 2 is formed by assembling a plurality of electromagnetic steel plates, the positions of the insert holes 23 formed in the electromagnetic steel plates may be dislocated more or less. As a result, the insert hole 23 may be partially narrowed, thus making it difficult to press-fit the projection 4 into the insert hole 23. However, according to the present embodiment, the projection 43 is fixed within the insert hole 23 by rotating the coil fixing member 4 after the projection 43 is inserted into the insert hole 23 in a direction in which the projection 43 can be easily inserted. This facilitates the attachment of the coil fixing member 4 even if the insert hole 23 has a large dimensional error.

Referring to FIGS. 8A to 11B, other examples in which the coil fixing member 4 is attached to the stator core 2 will be described.

Figure 8A:
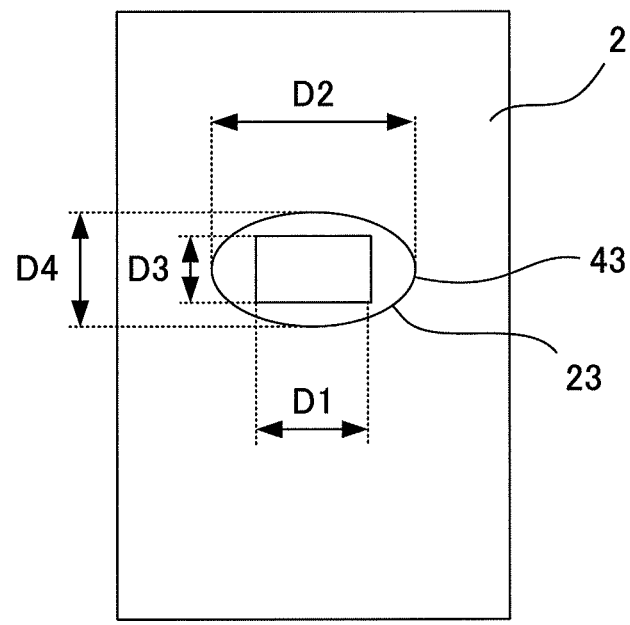
FIG. 8A is a diagram for illustrating a process of inserting the coil fixing member into the insert hole.
Figure 8B:
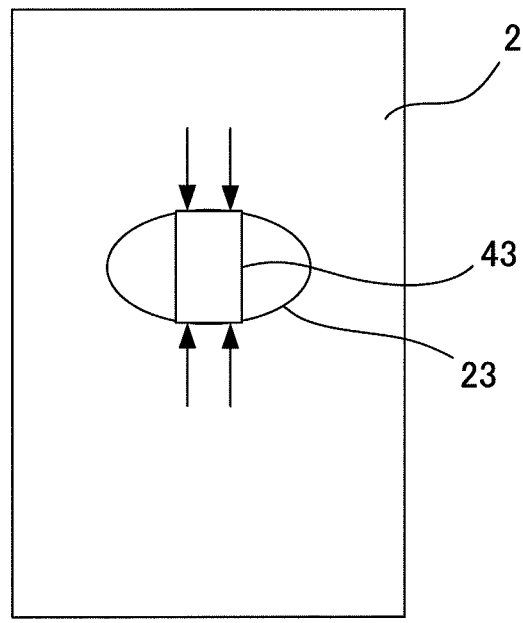
FIG. 8B is a diagram for illustrating a process of inserting the coil fixing member into the insert hole.

FIGS. 8A and 8B are diagrams corresponding to FIGS. 5A and 5B, respectively. In this case, the insert hole 23 has an elliptic cross section and the projection 43 has a rectangular cross section. The projection 43 and the insert hole 23 are sized so that the dimension D1 of the long side of the projection 43 is smaller than the dimension D2 of the major axis of the insert hole 23 and greater than the dimension D4 of the minor axis of the insert hole 23. Further, the projection 43 and the insert hole 23 are sized so that the dimension D3 of the short side of the projection 43 is smaller than the dimension D4 of the minor axis of the insert hole 23. As shown in FIG. 8A, the projection 43 is inserted into the insert hole 23 with the long side of the projection 43 oriented generally parallel to the major axis of the insert hole 23, and thereafter, the projection 43 is turned 90 degrees in the insert hole 23 as shown in FIG. 8B, whereby the projection 43 is press-fitted into the insert hole 23. The projection 43 receives a compressive force from the wall of the insert hole 23 as indicated by the arrows in FIG. 8B. In this way, the projection 43, or the coil fixing member 4, can be fixed at a predetermined position relative to the stator core 2.

Figure 9A:
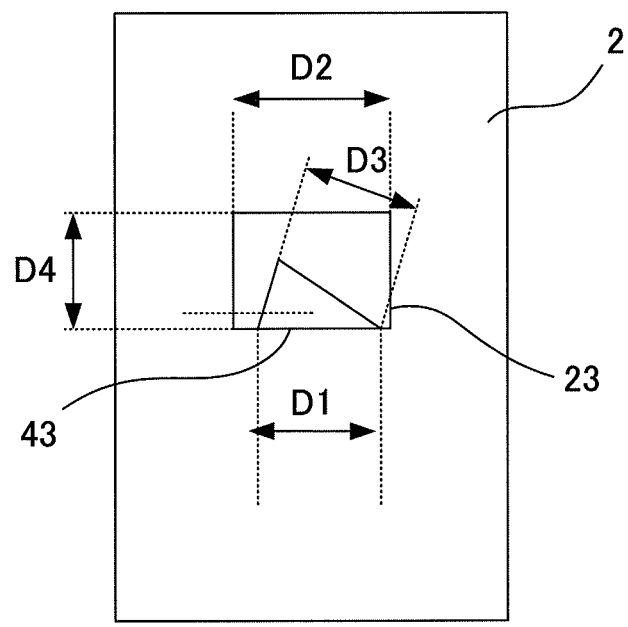
FIG. 9A is a diagram for illustrating a process of inserting the coil fixing member into the insert hole.
Figure 9B:
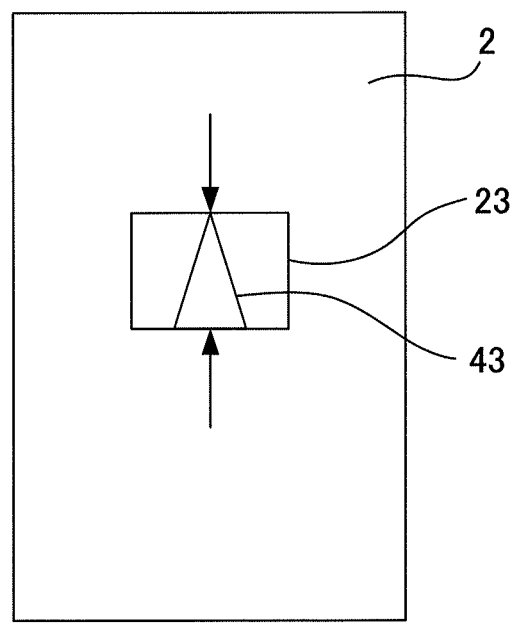
FIG. 9B is a diagram for illustrating a process of inserting the coil fixing member into the insert hole.

In the example shown in FIGS. 9A and 9B, the insert hole 23 has a rectangular cross section and the projection 43 has a triangular cross section. In this case, the projection 43 and the insert hole 23 are sized so that the dimension D1 of the oblique side of the projection 43 is smaller than the dimension D2 of the long side of the insert hole 23 and the height dimension D3 of the projection 43 is greater than the dimension D4 of the short side of the insert hole 23. For example, the projection 43 may be inserted into the insert hole 23 with the oblique side oriented in a direction parallel to the long side D2 of the insert hole 23, as shown in FIG. 9A. Thereafter, the projection 43 is turned so that the height direction of the projection 43 is parallel to the short side of the insert hole 23, as shown in FIG. 9B. As a result, the projection 43 receives a compressive force from the wall of the insert hole 23 as indicated by the arrows. In this way, the coil fixing member 4 can be fixed at a predetermined position relative to the stator core 2.

Figure 10A:
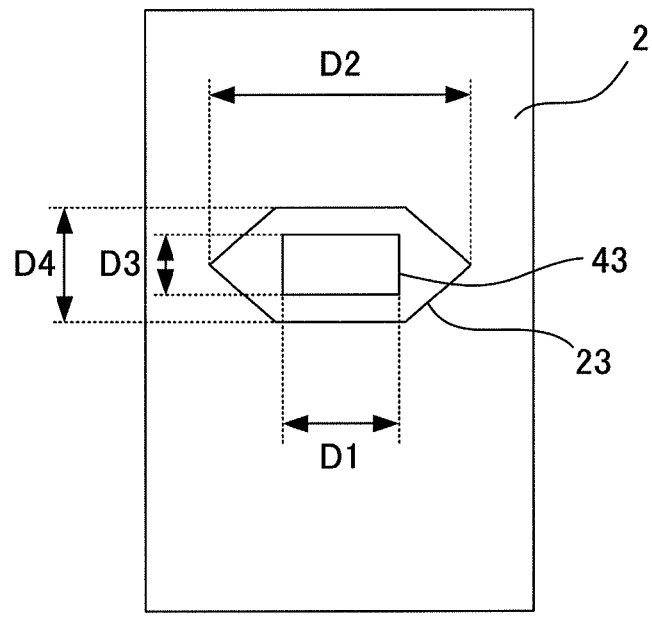
FIG. 10A is a diagram for illustrating a process of inserting the coil fixing member into the insert hole.
Figure 10B:
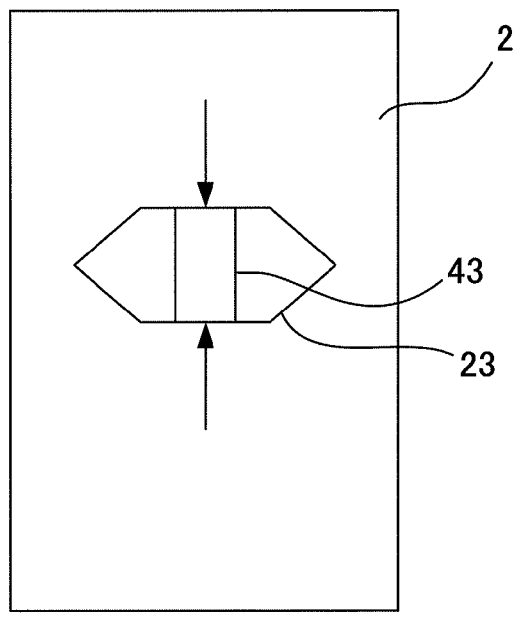
FIG. 10B is a diagram for illustrating a process of inserting the coil fixing member into the insert hole.

In the example shown in FIGS. 10A and 10B, the insert hole 23 has a flattened hexagonal cross section and the projection 43 has a rectangular cross section. In this case, the projection 43 and the insert hole 23 are sized so that the dimension D1 of the long side of the projection 43 is smaller than the transverse dimension D2 of the insert hole 23 and greater than the vertical dimension D4 of the insert hole 23. Further, the dimension D3 of the short side of the projection 43 is sized to be smaller than the vertical dimension D4 of the insert hole 23. As shown in FIG. 10A, the projection 43 is inserted into the insert hole 23 with the long side oriented in the transverse direction. Thereafter, the projection 43 is turned 90 degrees so that the long side of the projection 43 is oriented vertically, as shown in FIG. 10B. As a result, the projection 43 receives a compressive force from the wall of the insert hole 23 as indicated by the arrows in FIG. 10B. In this way, the coil fixing member 4 can be fixed at a predetermined position relative to the stator core 2.

Figure 11A:
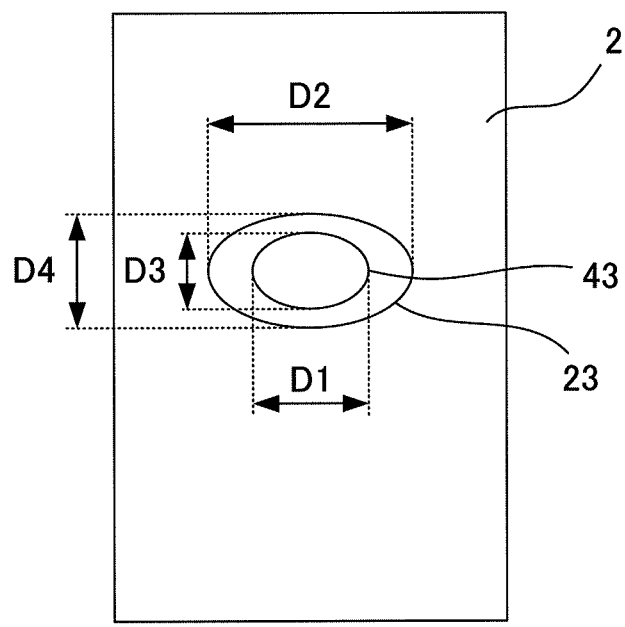
FIG. 11A is a diagram for illustrating a process of inserting the coil fixing member into the insert hole; and, FIG. 11B is a diagram for illustrating a process of inserting the coil fixing member into the insert hole.
Figure 11B:
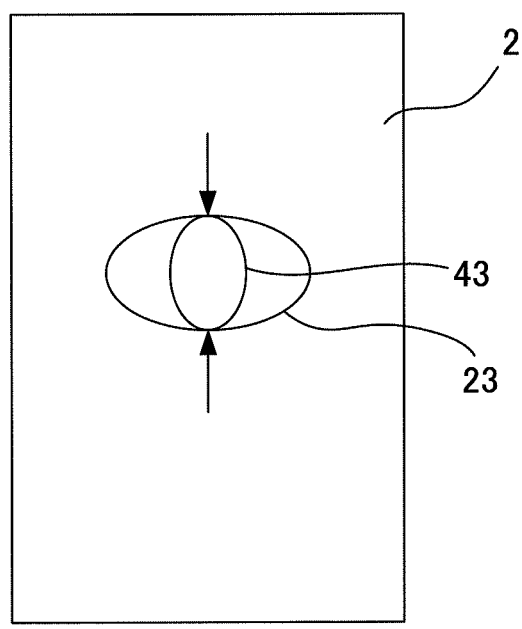

In the example shown in FIGS. 11A and 11B, the insert hole 23 and the projection each have an elliptic cross section, respectively. The dimension D1 of the major axis of the projection 43 is sized to be smaller than the dimension D2 of the major axis of the insert hole 23 and greater than the dimension D4 of the minor axis of the insert hole 23. Further, the dimension D3 of the minor axis of the projection 43 is sized to be smaller than the dimension D4 of the minor axis of the insert hole 23. As shown in FIG. 11A, the projection 43 is inserted into the insert hole 23 with the major axis of the projection 43 oriented in a direction generally parallel to the major axis of the insert hole 23. Thereafter, the projection 43 is turned so that the major axis of the projection 43 is oriented in a direction parallel to the minor axis of the insert hole 23, as shown in FIG. 11B. As a result, the projection 43 receives a compressive force from the wall of the insert hole 23 as indicated by the arrows in FIG. 11B. In this way, the coil fixing member 4 can be fixed at a predetermined position relative to the stator core 2.

EFFECT OF THE INVENTION

According to the present invention, it is possible to provide a stator provided with common coil fixing members that are simple in structure, but still can be applicable to stator cores of different shapes and sizes. This can reduce the manufacturing cost of the stator and of the electric motor.

Although various embodiments and variants of the present invention have been described above, it is apparent for a person skilled in the art that the intended functions and effects can also be realized by other embodiments and variants. In particular, it is possible to omit or replace a constituent element of the embodiments and variants, or additionally provide a known means, without departing from the scope of the present invention. Further, it is apparent for a person skilled in the art that the present invention can be implemented by any combination of features of the embodiments either explicitly or implicitly disclosed herein.

What is claimed is:
1. A stator of an electric motor, comprising:
a stator core having a yoke and teeth projecting from the yoke;
coils attached to the stator core so as to surround the teeth; and
coil fixing members which are each arranged at at least one of opposite ends of the stator core in a gap formed between an end face of the tooth and an inner side of the coil facing the end face to fix the coil,
wherein each of the coil fixing member comprises a locking part that projects on an opposite side from the end face of the tooth to lock the coil and a projection that projects on an opposite side from the locking part, and the projection is inserted into an insert hole formed on the stator core,
wherein the locking part is provided at a tip end side of the tooth.
2. The stator according to claim 1, wherein the projection receives a compressive force from a wall of the insert hole.
3. An electric motor comprising the stator according to claim 1.
4. A manufacturing process of manufacturing a stator of an electric motor, comprising attaching coil fixing members for fixing coils to a stator core,
wherein each of the coil fixing member comprises a locking part for locking the coil and a projection that projects on an opposite side from the locking part,
the manufacturing process comprising:
inserting the projection of the coil fixing member into an insert hole formed on the stator core; and
thereafter turning the coil fixing member about an axis line parallel to an insertion direction in which the projection is inserted into the insert hole so as to press-fit the coil fixing member into the insert hole.

* * * * *